J. R. DALY.
AUTOMATIC OILING DEVICE FOR GAS METER DIAPHRAGMS.
APPLICATION FILED MAR. 16, 1908.
940,304.
Patented Nov. 16, 1909.
2 SHEETS—SHEET 1.
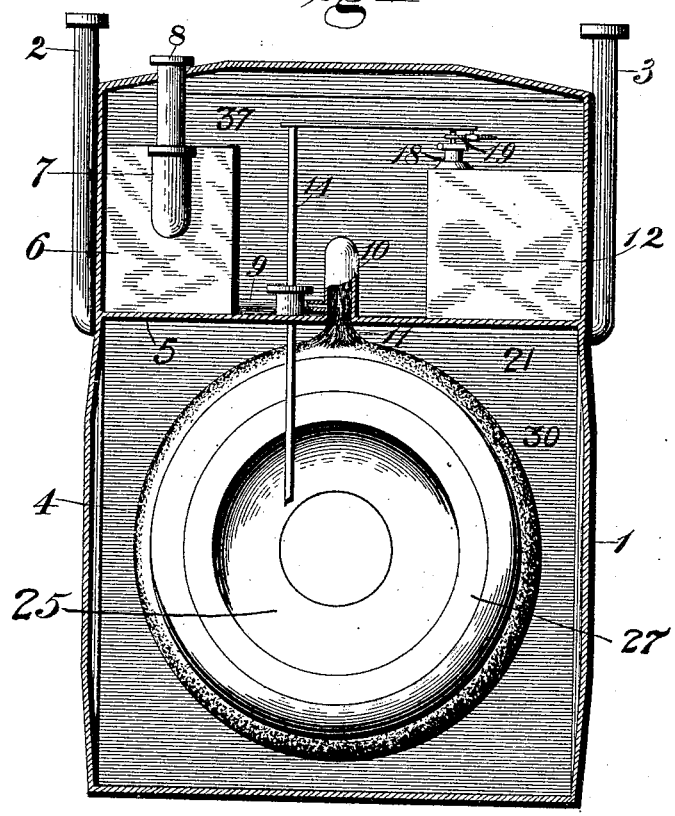
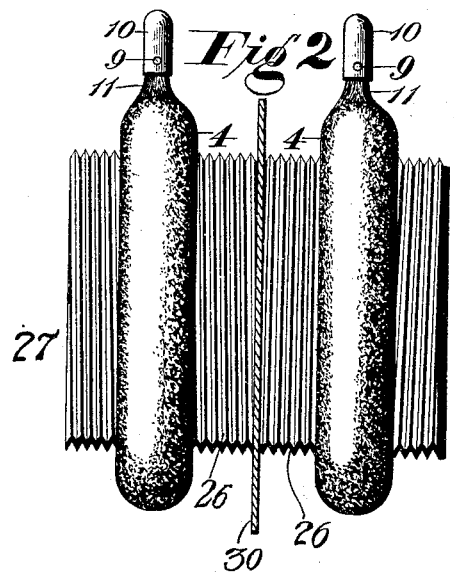
Witnesses
E. E. Overholt
J. A. Saul
Inventor
James R. Daly
By Wm R. Andrews,
Attorney.

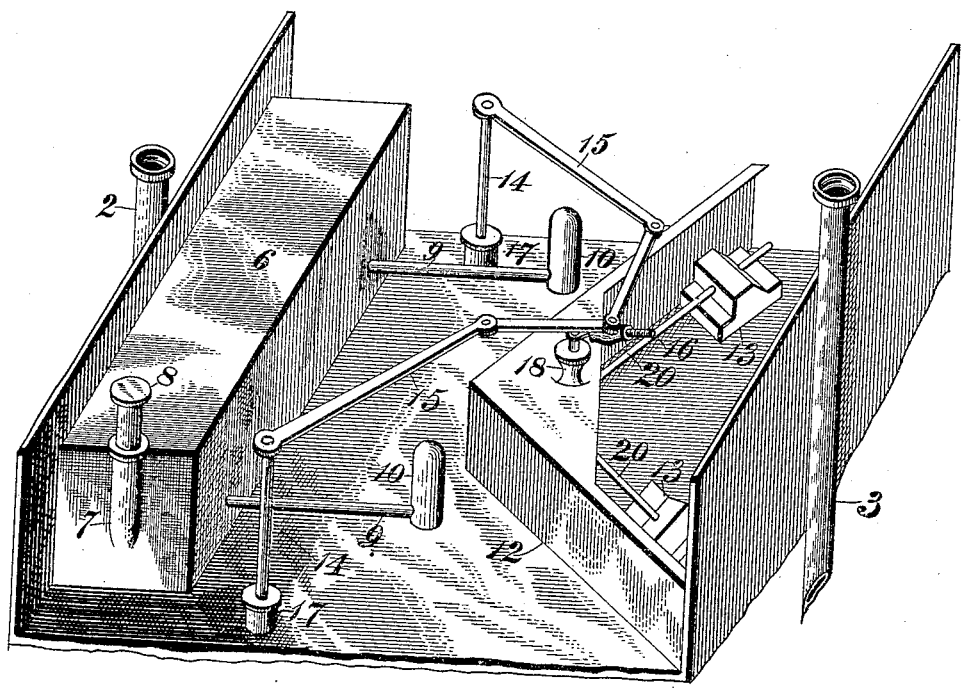
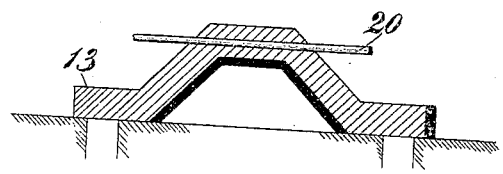

UNITED STATES PATENT OFFICE.

JAMES R. DALY, OF NEW ORLEANS, LOUISIANA, ASSIGNOR TO JOHN EMORY CROSS, OF BALTIMORE, MARYLAND.

AUTOMATIC OILING DEVICE FOR GAS-METER DIAPHRAGMS.

940,304.

Specification of Letters Patent. Patented Nov. 16, 1909.

Application filed March 16, 1908. Serial No. 421,582.

*To all whom it may concern:*

Be it known that I, JAMES R. DALY, a citizen of the United States of America, residing at New Orleans, in the parish of Orleans and State of Louisiana, have invented certain new and useful Improvements in Automatic Oiling Devices for Gas-Meter Diaphragms, of which the following is a specification, reference being had therein to the accompanying drawing.

The present invention relates to dry meters for measuring gas and particularly to meters of the general type which have as an important feature an expanding chamber to which the gas is admitted and from which it is released when the chamber is filled. Expansion of this chamber is provided for by means of a flexible diaphragm. The operation of these meters is well understood and need not be described.

The diaphragms are made of various materials but the one now most generally used is leather. To secure accurate measurement, it is necessary that the diaphragm be not only impervious to the gas to be measured, but that its flexibility be constant. It is an essential condition to the use of gas meters that they are in operation for long periods without attention. The nature of the gas used is such that it has a strong affinity for oil and in a short time it extracts the oil from the leather forming the diaphragm and the leather becomes hard, dry and porous and cracks develop. This condition of the diaphragm offers numerous obstacles to the operation of the meter, a portion of the gas passes through the pores and cracks in the leather and is not measured, and when the diaphragm becomes stiff and crisp, it not only offers increased resistance to the passage of the gas, but it does not inflate in the same form as when soft, and errors of measurement occur on this account.

The object of the present invention is to provide a lubricating device by means of which the diaphragm may be kept soft and pliable for a long period, during which the meter receives no attention. In this way, the pliability of the diaphragm is rendered constant, its pores are filled, cracking is prevented and the greatest accuracy of measuring is secured; also, the resistance to the passage of gas is maintained at the minimum.

I am aware that it is old to apply lubricant to the diaphragms of various pressure regulators for use with illuminating gas, but in the case of a regulator the problem of lubrication is a different one from that which occurs in a gas meter. In the regulator, as the diaphragm is exposed to the gas on one side only and the other, generally the upper side, is easy of access, the diaphragm may be lubricated in various ways, as by placing the oil on its upper surface, or by leading its edge into an annular reservoir of oil.

I am also aware that it is old to place a quantity of lubricating oil inside the measuring chamber of a gas meter to lubricate the diaphragm. This latter scheme is impracticable as to introduce the oil, the measuring chamber must be opened, allowing the escape of gas and entrance of air. In practice, the measuring chamber should be hermetically sealed during the entire life of the meter. Also, lubricating oil is rapidly taken up by the gas and a deposit of coal tar products and water is formed on the top of the oil after the meter has been in operation for some time.

By my invention which is the subject matter of this application, I supply to a diaphragm within the measuring chamber of a gas meter, such diaphragm being subjected to the pressure of gas on both sides, oil which comes from a receptacle which is separated from the measuring chamber so as to prevent access of the gas to the surface of the oil. The receptacle is preferably within the meter above the diaphragm and is of sufficient capacity to hold oil to lubricate the diaphragm for several months or a year.

The accompanying drawings illustrate an embodiment of my oiling device.

Figure 1 is a vertical cross-section of a gas meter showing the oiling device. Fig. 2 is an elevation of the disks and diaphragms of a double meter removed from the casing; the wicks and wick holders of my invention are shown in their operative relation to the diaphragms. Fig. 3 is a perspective view of the index chamber of a gas meter, the top and front and rear walls being removed. Fig. 4 is an enlarged cross-section of one of the valves showing a portion of the valve seat.

The meter consists of a casing 1 having an inlet 2 for gas and an outlet 3 for the same. The casing is divided by a horizontal partition 5 into a valve chamber 37 above and two measuring chambers 21 below. The latter are separated by a suitable vertical partition 30. The gas is excluded from the valve chamber and this chamber is made easy of access from without. Within each measuring chamber is an expanding and contracting chamber 25, so that each measuring chamber may be said to be divided into two expanding and contracting chambers. These chambers 25 consist each of a stationary disk or short cylinder 26 and a moving disk 27. The disks of each chamber 25 are connected by means of a loose flexible diaphragm 4. The movable disk of each chamber is connected by means of suitable gearing to a registering device to be described. The connecting means includes an upright shaft 14 for each disk 27 to be oscillated thereby as the disk moves back and forth. Each shaft 14 is connected by an arm 15 to the tangent screw 16, carried by the arm 19 of the valve shaft 18. Oscillation of the shaft 14 is communicated to the shaft 18 to which the valve rods 20 of the slide valves 13 are connected. By proper adjustment of this gearing, the oscillation of the shaft 14 caused by the reciprocation of the corresponding movable disk as the chambers are filled and emptied in the operation of the meter, communicates to the valves 13 the necessary reciprocating motion to admit the gas to one chamber and release it from another chamber at each stroke. The casing of the meter is provided with a reservoir 6 for oil, and may have a supply inlet 7 which is controlled by a cap 8. From this reservoir, horizontal tubes 9 lead to wick holders 10. The latter are in the form of upright tubes secured to the horizontal partition 5 which separates the upper from the lower chamber of the meter. These tubes are shown as closed at their upper extremities and open downward, directly over each diaphragm.

A wick 11 is placed in each tube 10 with its lower extremity which is spread out in the form of a brush in contact with the corresponding flexible diaphragm 4. The wick is made to fit snugly in the tube to prevent the escape of gas.

The tube 9, as well as the reservoir 6, is constantly filled with oil and may be hereinafter referred to as included in the term, container. The tube 9 and the wick, or the wick alone, may be hereinafter referred to as a conductor for oil.

In the operation of the device, a supply of oil is placed in the reservoir 6. This passes through the tubes 9 to the holders 10, so that each wick is kept supplied with oil which moves downward, partly by capillary attraction and partly by force of gravity, on to the corresponding diaphragm 4. The wicks of the tubes 9 are so proportioned as to supply to the diaphragm substantially the quantity of oil which is removed therefrom by the gas which flows through the meter.

I have described herein in detail a single embodiment of my invention in what I consider its preferred form. I do not, however, desire to limit myself to the details herein shown and described.

What I claim and desire to secure by Letters Patent is:

In a gas meter, a flexible diaphragm, both sides of which are normally in contact with the gas, a receptacle for oil isolated from the gas and separated therefrom so as to prevent free access of gas to the oil receptacle, a wick holder in the form of an upright tube closed at one end, a tube leading from the oil receptacle to the wick holder, and a wick, one end of which is in the holder, the wick extending from the holder into contact with the diaphragm.

In testimony whereof I affix my signature in presence of two witnesses.

JAMES R. DALY.

Witnesses:
L. M. JONES,
ROBERT EICHHORN.